United States Patent [19]
Eck et al.

[11] 3,758,550
[45] Sept. 11, 1973

[54] PROCESS FOR PRODUCING METHYLENE MALONIC ESTERS

[75] Inventors: Herbert Eck; Josef Heckmaier; Hellmuth Spes, all of Burghausen-Obb., Germany

[73] Assignee: Wacker-Chemie G.m.b.H., Munich, Germany

[22] Filed: July 27, 1971

[21] Appl. No.: 166,571

[30] Foreign Application Priority Data
Aug. 27, 1970 Germany.................. P 20 42 610.2

[52] U.S. Cl............................................ 260/485 R
[51] Int. Cl........................................... C07c 619/52
[58] Field of Search................................ 260/485 R

[56] References Cited
UNITED STATES PATENTS
2,212,506   8/1940   Bachman et al.................... 260/485
3,060,236   10/1962   Kollar et al........................ 260/485

Primary Examiner—Lorraine A. Weinberger
Assistant Examiner—E. Jane Skelly
Attorney—Donald Malcolm et al.

[57] ABSTRACT

A process for producing methylene malonic esters of the general formula $CH_2=C(-CO_2R)_2$, where R represents a branched or unbranched aliphatic residue of one to six C atoms, which comprises reacting a malonic ester of the general formula $CH_2(-CO_2R)_2$ dissolved in glacial acetic acid, where R has the meaning mentioned above, with paraformaldehyde in the presence of a catalyst at temperature stages between 0°C and the boiling point of the mixture, distilling off the solvent, and cracking the resulting product, in which process the reaction mixture contains 0.5 – 1.5 mol percent of acetic acid anhydride referred to the malonic ester.

2 Claims, No Drawings

PROCESS FOR PRODUCING METHYLENE MALONIC ESTERS

It is known how to produce methylene malonic ester (III) from the corresponding malonic ester (I) and paraformaldehyde (II) in accordance with the following reaction equation:

$$CH_2(-CO_2R)_2 + \frac{1}{x}(CH_2O)_x \xrightarrow{-H_2O} CH_2=C(-CO_2R)_2,$$
$$\text{I} \qquad \text{II} \qquad \qquad \text{III}$$

where R is a branched or unbranched, aliphatic residue with one to four C atoms. (J. Chem. Soc. Japan, Ind. Chem. Sect. 56, 901 – 903, (1953) and C.A. 49, P 1780g).

It has also been described that it is of advantage to carry out this reaction in glacial acetic acid in the presence of catalysts.

Described as catalysts are, among others, zinc chloride, potassium fluoride, iron, magnesium, aluminum hydroxide, the acetates of potassium, calcium, barium, zinc, cadmium, mercury, lead, copper and cobalt, and generally compounds with an alkaline reaction. The highest yields are: with zinc chloride 85%, copper acetate 79% and zinc acetate 77%. During subsequent processing, however, one can obtain only a maximum of 56% with zinc chloride (with $H_2O$ as the solvent; in glacial acetic acid only 43%), with zinc acetate 68% or 70%.

We have now discovered a process for producing methylene malonic esters of the general formula $CH_2=C(-CO_2R)_2$ where R represents a branched or unbranched, aliphatic residue of one to six carbon atoms, by reaction of malonic esters of the general formula $CH_2(-CO_2R)_2$, where R has the meaning described above, with paraformaldehyde in glacial acetic acid and in the presence of a catalyst at temperature gradients between 0°C and the boiling point of the mixture, and cracking the reaction product obtained after distilling off the solvent. The process is characterized by the fact that 0.5 – 1.5 mol %, preferably 0.8 – 1.1 mol %, of acetic acid anhydride, referred to the malonic ester used, is added to the reaction mixture.

Particularly suitable catalysts are magnesium and zinc chloracetate which are added in quantities of 0.5 to 10 gr, referred to 1 mol of malonic ester.

It is preferred to begin the reaction at 0° to 40° C, the temperature is increased after 0.5 up to 40 hours, preferably 0.5 to 10 hours, to 70° C up to the boiling point of the mixture, preferably 80° to 100° C, and the conversion is completed at this temperature in the course of 0.5 to 20 hours, preferably 1 to 10 hours. After or perhaps during cracking 0.01% to 3% of tetraalkyl titanate of the general formula $Ti(OR)_4$, wherein R designates an alkyl residue of two to six, preferably two to four carbon atoms, is added to the reaction mixture.

With these measures it is possible to produce a stable, acid-free reaction product, with a good yield. Here the strong effect of the chloracetate anion is surprising, because the expert would have expected that the cation is to be made responsible for the catalysts. In particular, no measurable effect of the chloracetate anion can be foreseen in glacial acetic acid solution. Moreover, under the given reaciton conditions the reaction is not reversible. Therefore the yield-increasing effect of the acetic acid anhydride is also surprising, since the reaction can likewise be performed in an aqueous medium.

The process is carried out as follows: generally the reaction takes place in at least two reaction sections, i.e. for instance in the first step at 0° to 10°C. After this it is heated to room temperature and finally the conversion is completed at above 70°C. In some cases it is possible to avoid the first or second temperature step. Also, at lower temperatures the reaction period can be continued for any length of time desired. However, it should last as least ½ hour. Possibly at this time the addition of (II) to (I) takes place to hydroxylmalonic ester $$HO-CH_2-CH(-CO_2R)_2 \qquad (IV)$$

Acetic acid anhydride must be added in a quantity that is sufficient to remove at least the main quantity of the created water, under formation of acetic acid, from the equilibrium. Here it is better to add the anhydride before the start of the reaction, instead of doing this only before or during the heatup.

The catalysts, e.g. zinc and magnesium chloracetate, are superior to the acetates. Yields of over 90% referred to the malonic ester used are obtained. Small quantities of methylene malonic ester which get into the condensate and into the first fraction during cracking, have not been included in computing the yield.

Useful results can also be obtained in accordance with the process of the invention with other catalysts, e.g. bases or salts of, for instance, the metals of the first, second or third principal groups as well as the first to fourth and eighth sub groups of the Periodic System with inorganic or organic, weak or strong acids. There quantities of up to 30%, referred to the magnesium and zinc chloracetate, are added.

The following acids are given as examples: carboxylic acids like formic acid, acetic, 2-ethylhexane, chloracetic and benzoic acid, compounds containing reactive methylene groups, like acetyl acetone, acetoacetic ester, diacetylacetic ester, triacetyl methane, malonic ester, cyanacetic ester, compounds containing hydroxyl groups like phenols, alcohols and water.

Suitable cations for the salts mentioned are for instance
a. monovalent: sodium
b. bivalent: beryllium, magnesium, calcium, copper, zinc, cadmium, mercury, cobalt, lead
c. trivalent: aluminum, iron
d. quadrivalent: tin.

Suitable for increasing the stability of the reaction product, are strong proton acids like phosphoric acid and sulphuric acid. Better results are achieved with aprotonic acids, particularly with boron fluoride etherate. Surprisingly, tetraalkyl titanates of the general formula $Ti(OR)_4$ where R represents an alkyl residue with two to six, preferably two to four C atoms, show a particularly favorable effect. Examples are tetraethyl-, tetrabutyl- and tetrahexyl titanate.

EXAMPLES

The methylene malonic esters listed in table 1 are produced as follows:

A mixture of malonic ester, paraformaldehyde, 289 g glacial acetic acid and in various of the test runs acetic acid anhydride were compounded under stirring at 0° C with the catalyst, heated to room temperature in accordance with the time shown in table 1, and finally, after 1 to 15 hours, were heated to 95° C. After distilling off the solvent at about 10 mm mercury column, the product, which most often is obtained in the form of a gel, was cracked. The conditions in Examples 1 – 18 shown in the table were as follows: still temperature up to 310° C, temperature of the heating bath up to 350° C, head temperature of the distilling apparatus up to about 225° C, vacuum 10 mm mercury column. In Examples 19 and 20 the cracking was performed at 0.1 – 2 mm mercury column and a still temperature of up to 360° C. The head temperature under these conditions in both cases did not rise above 225° C.

TABLE 1

| Example No. | Malonic ester I Mol | R | Paraformaldehyde II Mol referred to CH$_2$O | Acetic acid anhydride Mol |
|---|---|---|---|---|
| 1 | 0.722 | CH$_3$ | 1.44 | — |
| 2 | 0.722 | CH$_3$ | 1.44 | 0.7 |
| 3 | 0.722 | CH$_3$ | 1.44 | 0.7 |
| 4 | 0.722 | CH$_3$ | 1.44 | — |
| 5 | 0.722 | CH$_3$ | 1.44 | 0.7 |
| 6 | 0.722 | CH$_3$ | 1.44 | — |
| 7 | 0.722 | CH$_3$ | 1.44 | 0.722 |
| 8 | 0.722 | CH$_3$ | 1.44 | — |
| 9 | 0.722 | CH$_3$ | 1.44 | 0.722 |
| 10 | 0.722 | CH$_3$ | 1.44 | — |
| 11 | 0.722 | CH$_3$ | 1.44 | — |
| 12 | 0.722 | CH$_3$ | 1.44 | 0.722 |
| 13 | 0.722 | CH$_3$ | 1.44 | — |
| 14 | 0.722 | CH$_3$ | 1.44 | — |
| 15 | 0.722 | CH$_3$ | 1.44 | 0.8 |
| 16 | 0.722 | CH$_3$ | 1.44 | 0.8 |
| 17 | 0.722 | CH$_3$ | 1.44 | — |
| 18 | 0.722 | CH$_3$ | 1.44 | 0.722 |
| 19 | 0.722 | C$_4$H$_9$ | 1.44 | 0.722 |
| 20 | 0.722 | C$_6$H$_{13}$ | 1.44 | 0.722 |

Notable literature references:
[1]C.A. 49, P 1780 g
[2]J. Chem. Soc. Japan, Ind. Chem. Sect. 56, 901-3 (1953), C.A. 49, 6863 c.

TABLE 1

| | Catalyst kind | g | Reaction conditions 0°/h | RT/h | 95°/h | Yield % |
|---|---|---|---|---|---|---|
| 1 | Na-chloracetate | 8.66 | 4 | 15 | 8 | 47 |
| 2 | do. | " | 4 | 15 | 8 | 61 |
| 3 | Na-acetate | " | 4 | 15 | 8 | 54 |
| 4 | ZnCl$_2$ | " | 4 | 15 | 8 | 43 |
| 5 | do. | " | 4 | 15 | 8 | 58 |
| 6 | Zn-acetate | " | 4 | 15 | 8 | 70 |
| 7 | do. | " | 1 | 1 | 5 | 74 |
| 8 | Zn-chloracetate | " | 1 | 1 | 5 | 72 |
| 9 | do. | " | 1 | 1 | 5 | 86 |
| 10 | Cu-acetate | " | 1 | 1 | 5 | 68 |
| 11 | Mg-acetate | " | 1 | 1 | 5 | 63 |
| 12 | do. | " | 1 | 1 | 5 | 69 |
| 13 | Li-acetate | " | 1 | 1 | 5 | 7 |
| 14 | Li-chloracetate | " | 1 | 1 | 5 | 23 |
| 15 | HgSO$_4$/Co-acetylacetonate | 4.4 | 1 | 1 | 5 | 48 |
| 16 | MgCO$_3$/Al(OH$_3$) | 4.4 | 1 | 1 | 5 | 68 |
| 17 | Mg-chloracetate | 8.66 | 1 | 1 | 5 | 75 |
| 18 | do. | " | 1 | 1 | 5 | 90 |
| 19 | do. | " | 1 | 1 | 5 | 49 |
| 20 | do. | " | 1 | 1 | 5 | 44 |

To examine the stability of the reaction product, the substances shown in Table 2 were added each time to 10 g of the methylene malonic acid dimethyl ester, and the mixture was stored at room temperature.

TABLE 2

| Additive | mg | Container material | Duration of jelling in days |
|---|---|---|---|
| tetrabutyl titanate | 6 | Jena glass | 120* (no discoloration) |
| BF$_3$-etherate | 0.1 | Polyethylene | 30* |
| " | 1 | Polyethylene | 30 (yellowish)* |
| " | 10 | Polyethylene | 4 (yellow) |
| tetrabutyl titanate | 0.1 | Polyethylene | 30* |
| " | 1 | Polyethylene | 30* |
| " | 10 | Polyethylene | 30* (yellow)* |
| tetraethyl titanate | 1 | Polyethylene | 30* |
| tetrabutyl titanate | 1 | Aluminum | 30* |

No jelling occured by the end of the test

We claim:

1. In a process for the production of a methylene malonic ester of the formula CH$_2$=C(COOR)$_2$, wherein R is an aliphatic moiety having from one to six carbon atoms, by reacting a malonic ester of the formula CH$_2$(COOR)$_2$, dissolved in glacial acetic acid, with paraformaldehyde at temperatures between 0° C and the boiling point of the mixture, the improvement comprising carrying out the reaction in the presence of a magnesium chloracetate or zinc chloracetate catalyst in an amount of from 0.5 to 10 grams per mol of the malonic ester reactant and from 0.5 to 1.5 mol % acetic anhydride per mol of said reactant.

2. The process of claim 1, in which from 0.01% to 3% of a tetraalkyl titanate, the alkyl groups of which have from two to six carbon atoms, is added to the reaction mixture.

* * * * *